Jan. 23, 1951  R. K. LUNEBURG  2,538,841
WIDE FIELD ANGLE OBJECTIVE
Filed Jan. 28, 1946  2 Sheets-Sheet 1
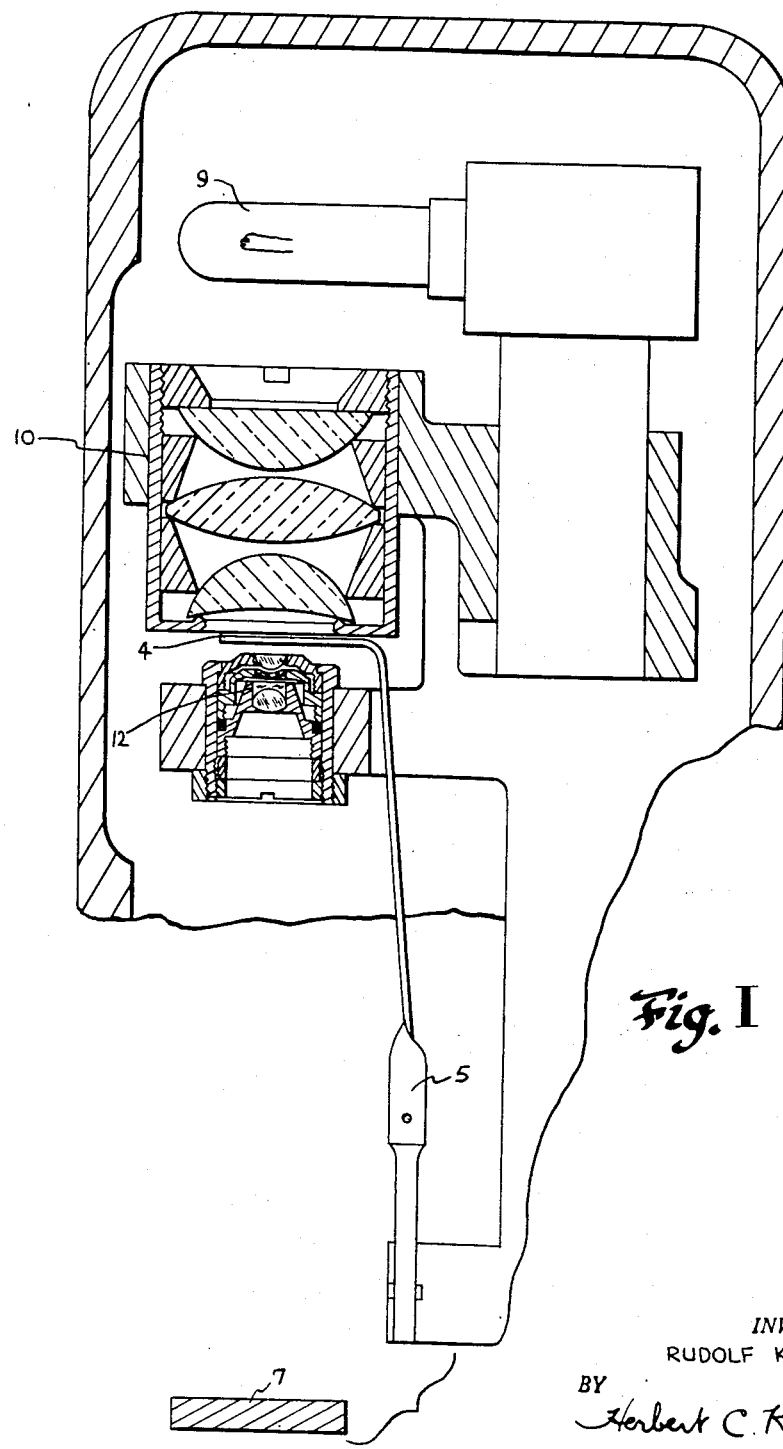
Fig. I
INVENTOR.
RUDOLF K. LUNEBURG
BY Herbert C. Kimball
ATTORNEY Jan. 23, 1951     R. K. LUNEBURG     2,538,841
WIDE FIELD ANGLE OBJECTIVE
Filed Jan. 28, 1946     2 Sheets-Sheet 2
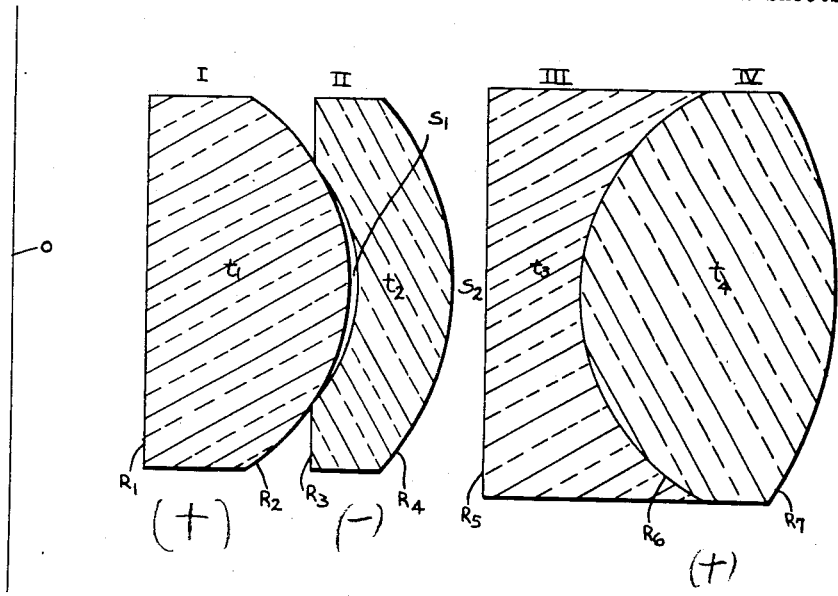
| F: 0.5 | NA: 0.25 | F=100 mm | MAGNIFICATION = 24X | |
|---|---|---|---|---|
| LENS | $N_D$ | V | RADII | SPACINGS |
| I | 1.517 | 64.4 | $R_1 = \infty$<br>$R_2 = -41.68$ | $t_1 = 40.$<br>$S_1 = 0.3$ |
| II | 1.649 | 33.8 | $R_3 = -33.1$<br>$R_4 = -54.78$ | $t_2 = 18.$<br>$S_2 = 6.56$ |
| III | 1.58 | 41. | $R_5 = \infty$<br>$R_6 = +44.04$ | $t_3 = 20.$ |
| IV | 1.517 | 64.4 | $R_7 = -72.38$ | $t_4 = 50.$ |
*Fig.* II
INVENTOR.
RUDOLF K. LUNEBURG
BY Herbert C. Kimball
ATTORNEY Patented Jan. 23, 1951

2,538,841

UNITED STATES PATENT OFFICE 2,538,841

WIDE FIELD ANGLE OBJECTIVE

Rudolf K. Luneburg, Buffalo, N. Y., assignor to American Optical Company Southbridge, Mass., a voluntary association of Massachusetts Application January 28, 1946, Serial No. 643,890

5 Claims. (Cl. 88—57)

This invention relates to a lens system, such as a microscope objective, of short focal length; and particularly to such a system having an unusualy wide field angle.

An object of the invention is to provide an improved lens system, such as an objective of short focal length, which will serve to indicate with considerable magnification the movement of an element of a mechanical system by projecting a shadow profile of the element onto a screen such as a scale.

The lens system in accordance with my invention has a relatively large aperture, and at the same time the image produced is sufficiently free from distortion to permit accurate readings on the scale of the shift of the projected shadow profile of the element which moves.

I have found that an improved lens system suitable for my purpose is obtained if in a high power objective of the type having a thick, strongly positive front element with its more weakly curved or plane surface in front, there is provided as the second element of the system a minus lens which is preferably made of a high index glass so as to increase the negative power of this second element.

In high power microscope objectives of the type referred to, the second element is commonly a positive meniscus lens concave toward the first element. These positive elements may be succeeded by a lens combination effective for compensating for certain aberrations introduced and for giving the required magnification and color correction, generally one or more cemented doublets. These commonly used lens systems do not have sufficient width of field angle to function as an objective for projecting with the desired magnification the movement of an indicator onto a screen such as a scale. The field angle of such a lens system is markedly widened by using a negative lens as the second element, especially if this element is made of a high index glass. At the same time the field is flattened, while obtaining a system in which the other aberrations are restricted within the required narrow limits.

In a compact relation of the elements of my improved lens system, the negative second element is in touching relation with the positive front element and as in this relation there is annular contact between these two elements, accuracy in centering of one element relative to the other is assured.

In the drawing:

Figure I shows one type of mechanical system having a movable element whose image, as projected by my improved lens system, is to move over a screen such as a scale, and Figure II shows one illustrative embodiment which my improved lens system may assume.

The mechanical system shown in Figure I may be a gage or other measuring mechanism having an element 4 carried by an arm 5. In the operation of this mechanical system the element 4, which as shown takes the form of an opaque target, is moved transversely relative to the optical system, about to be described, by the gaging spindle (not shown) or the like of the measuring mechanism. The image of the target 4 is projected onto an opaque screen diagrammatically illustrated at 7. The contour of screen 7 (which is not evident from Figure I due to the plane in which the section is taken) is a relatively shallow curve to correspond to the flattened field of the objective. In this way the image of the target 7 is at all times maintained in focus on the screen.

Illumination for the optical system is afforded by a lamp 9, and light rays from this lamp are concentrated upon the target 4 by a condensing lens system 10. As the target 4 is moved transversely relative to the axis of the optical system, and as its image is projected by my improved lens system, generally indicated by the numeral 12, as a shadow onto the screen 7, the operator may read the amount of deviation of the gaging spindle or the like by observing the position of the projected shadow of the target 4 relative to the graduated scale on the screen 7.

The form of my improved lens system which I have selected for illustration in Figure II is composed of a thick strongly positive front element with its front surface plane. The second element is a negative lens made of glass of refractive index at least as high as that of medium flint or 1.617 and is preferably made of dense flint. It will be noted that the combination of this negative lens with the front element provides correction for color and spherical aberration. By proper selection of the surfaces of these lenses and of the cemented doublet, coma and distortion are kept within narrow limits and a flattened field is obtained.

In the compact arrangement which I have illustrated in Figure II the second element is in touching relation with the back surface of the first element. This has the additional advantage that centering of one element relative to the other is assured.

The lens system of Figure II has the following characteristics:

| Lens | $N_D$ | V | Radii | Spacings |
|---|---|---|---|---|
| I | 1.517 | 64.4 | $R_1 = \infty$ | $t_1 = 40$ |
|   |       |      | $R_2 = -41.68$ | $s_1 = 0.3$ |
| II | 1.649 | 33.8 | $R_3 = -33.1$ | |
|    |       |      | $R_4 = -54.78$ | $t_2 = 18$ |
|    |       |      | $R_5 = \infty$ | $s_2 = 6.56$ |
| III | 1.58 | 41 | | |
|     |      |    | $R_6 = +44.04$ | $t_3 = 20$ |
| IV | 1.517 | 64.4 | | $t_4 = 50$ |
|    |       |      | $R_7 = -72.38$ | | f:0.5  NA:0.25  F=100 mm.  Magnification=24X where the Roman numerals refer to elements starting with the short conjugate or front side, $N_D$ is the index of refraction with reference to the D line of the spectrum, V is the dispersive index, $R_1$ to $R_7$ are the radii of curvature of the refractive surfaces consecutively from front to rear, the + and − signs refer respectively to surfaces convex and concave to the front, $t_1$ to $t_4$ are the axial thicknesses of the elements, $s_1$ and $s_2$ are the air space thicknesses between elements I and II and between elements II and III, NA is the numerical aperture, $f$ is the aperture ratio and F is the focal length of the lens system, the contacting surfaces of the doublet member being cemented.

A lens system embodying the invention may also be expressed as follows:

| Lens | $N_D$ | V | Radii | Spacings |
|---|---|---|---|---|
| I | 1.517 | 64.4 | $R_1 = \infty$ | $t_1 = .4\ F$ |
|   |       |      | $R_2 = -.4\ F$ | $s_1 = .003\ F$ |
| II | 1.649 | 33.8 | $R_3 = -.33\ F$ | |
|    |       |      | $R_4 = -.55\ F$ | $t_2 = .2\ F$ |
|    |       |      | $R_5 = \infty$ | $s_2 = .06\ F$ |
| III | 1.58 | 41 | | |
|     |      |    | $R_6 = +44\ F$ | $t_3 = .2\ F$ |
| IV | 1.517 | 64.4 | | $t_4 = .5\ F$ |
|    |       |      | $R_7 = -.7\ F$ | | where the Roman numerals refer to elements starting with the short conjugate or front side, F is the focal length of the lens system, $N_D$ is the index of refraction with reference to the D line of the spectrum, V is the dispersive index, $R_1$ to $R_7$ are the radii of curvature of the refractive surfaces consecutively from front to rear, the + and − signs refer respectively to surfaces convex to concave to the front, $t_1$ to $t_4$ are the axial thicknesses of the elements, $s_1$ and $s_2$ are the air space thicknesses between elements I and II and between elements II and III.

In Figure II the object field (the plane in which target 4 moves) is indicated at 0.

The advantages of my improved lens system are evident from the example which I have just described and may be advantageously applied, for instance, to a 5 mm. objective. This 5 mm. objective would have a field angle of from 60° to 80° which is ample for the purposes of the usual measuring mechanism, as for instance the mechanism illustrated in Figure I. In addition to the short focal length and the large field, this objective is free from distortion and has a remarkably high aperture. This large aperture contributes to the accuracy of measuring with the instrument; as the contrast of the shadow of the target 4 on the scale 7 is intensified by the amount of light passing through the objective 12.

It is to be understood that while I have illustrated how my improved lens system may be used by a specific example, and have selected one form of my improved lens system for illustration in Figure II, my invention may be otherwise embodied and practiced within the scope of the following claims.

I claim:

1. A relatively short focal length, high speed microscope objective arranged to provide a relatively high magnification and composed of three axially aligned components, said objective being highly corrected for spherical aberration and lateral color, and substantially free from coma and distortion, the front component of said objective being a strongly positive lens element of predetermined refractive index and having its front surface substantially flat, its rear surface strongly curved, and its thickness substantially equal to the radius of said rear surface, the middle component of said objective being a negative meniscus lens element having a refractive index appreciably higher than the refractive index of said front component and having its front surface concaved and more strongly curved than the strongly curved rear surface of said front component, said elements being nested together so as to provide only a small axial spacing between said strongly curved surfaces, and the rear component of said objective being a strongly positive doublet positioned close to but spaced axially from said negative meniscus lens element and comprising a strongly negative front element and a strongly positive rear element, said front negative element having a refractive index less than that of said middle component and said positive rear element having a refractive index of lesser value and approximately equal to that of said front component, whereby an objective having a relatively wide field angle and a relatively flat image field is effected.

2. A relatively short focal length, high speed microscope objective arranged to provide a relatively high magnification and composed of three axially aligned components, said objective being highly corrected for spherical aberration and lateral color, and substantially free from coma and distortion, the front component of said objective being a strongly positive lens element of predetermined refractive index and having its front surface substantially flat, its rear surface strongly curved, and its thickness substantially equal to the radius of said rear surface, the middle component of said objective being a negative meniscus lens element having a refractive index appreciably higher than the refractive index of said front component and having its front surface concaved and more strongly curved than the strongly curved rear surface of said front component, said elements being positioned so as to provide only a small axial spacing between said strongly curved surfaces, and with said negative meniscus being of such a thickness and its rear surface of such a radius that the center of curvature thereof will lie closely adjacent the front surface of said front component, and the rear component of said objective being a strongly positive doublet positioned close to but spaced axially from said negative meniscus lens element, and comprising a strongly negative front element and a strongly positive rear element, said front negative element having a refractive index less than that of said middle component, and said positive rear element having a refractive index of lesser value and approximately equal to that of said front component, whereby an objective having a relatively wide field angle and a relatively flat image field is effected.

3. A relatively short focal length, high speed microscope objective arranged to provide a relatively high magnification and composed of three axially aligned components, said objective being highly corrected for spherical aberration and lateral color, and substantially free from coma and distortion, the front component of said objective being a strongly positive lens element formed of material having a refractive index of approximately 1.52 and having its front surface substantially flat, its rear surface strongly curved, and its thickness substantially equal to the radius of said rear surface, the middle component being a negative meniscus lens element formed of a material having a refractive index between approximately 1.61 and 1.65 and having its front surface concaved and more strongly curved than the strongly curved rear surface of said front component, said elements being nested together so as to provide only a small axial spacing between said strongly curved surfaces, and the rear component of said objective being a strongly positive doublet positioned close to but spaced axially from said negative meniscus lens element and comprising a strongly negative front element of a refractive index of approximately 1.58 and a strongly positive rear element having a refractive index approximately equal to that of said front component, whereby an objective having a relatively wide field angle and a relatively flat image field is effected.

4. A relatively short focal length, high speed microscope objective arranged to provide a relatively high magnification and composed of three axially aligned components, said objective being highly corrected for spherical aberration and lateral color, and substantially free from coma and distortion, the front component of said objective being a strongly positive lens element of predetermined refractive index and having its front surface substantially flat, its rear surface strongly curved, and its thickness substantially equal to the radius of said rear surface, the middle component of said objective being a negative meniscus lens element having a refractive index appreciably higher than the refractive index of said front component and having its front surface concaved and more strongly curved than the strongly curved rear surface of said front component, said elements being positioned so as to provide only a small axial spacing between said strongly curved surfaces while having annular contact outwardly thereof, and with said negative meniscus being of such a thickness and its rear surface of such a radius that the center of curvature thereof will lie closely adjacent the front surface of said front component, and the rear component of said objective being a strongly positive doublet positioned close to but spaced axially from said negative meniscus lens element, and comprising a strongly negative front element and a strongly positive double convex rear element, said front negative element having a substantially flat front surface and refractive index less than that of the said middle component, and said positive rear element having a refractive index of lesser value and approximately equal to that of said front component, the rear surface of said doublet having a radius approximately equal to the thickness of said doublet, whereby an objective having a relatively wide field angle and a relatively flat image field is effected.

5. A microscope objective having a wide field angle having approximately the following specifications:

| Lens | $N_D$ | V | Radii | Spacings |
|---|---|---|---|---|
| I | 1.517 | 64.4 | $R_1 = \infty$ | $t_1 = .4\ F$ |
| | | | $R_2 = -.4\ F$ | $s_1 = .003\ F$ |
| II | 1.649 | 33.8 | $R_3 = -.33\ F$ | |
| | | | $R_4 = -.55\ F$ | $t_2 = .2\ F$ |
| | | | $R_5 = \infty$ | $s_2 = .06\ F$ |
| III | 1.58 | 41 | | |
| | | | $R_6 = +44\ F$ | $t_3 = .2\ F$ |
| IV | 1.517 | 64.4 | | $t_4 = .5\ F$ |
| | | | $R_7 = -.7\ F$ | | where the Roman numerals refer to elements starting with the short conjugate or front side, F is the focal length of the lens system, $N_D$ is the index of refraction with reference to the D line of the spectrum, V is the dispersive index, $R_1$ to $R_7$ are the radii of curvature of the refractive surfaces consecutively from front to rear, the $+$ and $-$ signs refer respectively to surfaces convex and concave to the front, $t_1$ to $t_4$ are the axial thicknesses of the elements, $s_1$ and $s_2$ are the air space thicknesses between elements I and II and between elements II and III.

RUDOLF K. LUNEBURG.

REFERENCES CITED

The following references are of record in the file of this patent:

UNITED STATES PATENTS

| Number | Name | Date |
|---|---|---|
| 721,240 | Rudolph | Feb. 24, 1903 |
| 1,668,956 | Frederick | May 8, 1928 |
| 1,812,717 | Rudolph | June 30, 1931 |
| 1,812,851 | Altman | July 7, 1931 |
| 1,956,736 | Thun | May 1, 1934 |
| 2,050,024 | Sonnefeld | Aug. 4, 1936 |
| 2,206,155 | Boegehold | July 2, 1940 |
| 2,313,460 | Warmishaw | Mar. 9, 1943 |
| 2,324,081 | Herzberger | July 13, 1943 |
| 2,363,770 | Bennett | Nov. 28, 1944 |
| 2,371,165 | Glancy | Mar. 13, 1945 |

FOREIGN PATENTS

| Number | Country | Date |
|---|---|---|
| 537,460 | France | Mar. 3, 1922 |